(12) United States Patent
Sekimoto (10) Patent No.: US 9,488,225 B2
(45) Date of Patent: Nov. 8, 2016

(54) ROLLING BEARING APPARATUS AND LUBRICATION UNIT

(71) Applicant: JTEKT CORPORATION, Osaka-shi, Osaka (JP)

(72) Inventor: Hiroshi Sekimoto, Sakurai (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/801,714

(22) Filed: Jul. 16, 2015

(65) Prior Publication Data
US 2016/0025139 A1      Jan. 28, 2016

(30) Foreign Application Priority Data
Jul. 23, 2014   (JP) ................................ 2014-150195

(51) Int. Cl.
| F16C 32/00 | (2006.01) |
|---|---|
| F16C 33/66 | (2006.01) |
| F16C 41/00 | (2006.01) |
| F16C 19/06 | (2006.01) |

(52) U.S. Cl.
CPC ....... *F16C 33/6651* (2013.01); *F16C 33/6674* (2013.01); *F16C 33/6688* (2013.01); *F16C 41/004* (2013.01); *F16C 19/06* (2013.01)

(58) Field of Classification Search
CPC .............. F16C 33/6637; F16C 33/664; F16C 33/6651; F16C 33/6655; F16C 33/6677; F16C 33/6688; F16C 41/002; F16C 2233/00
See application file for complete search history.

(56) References Cited

U.S. PATENT DOCUMENTS

| 5,626,470 | A * | 5/1997 | Gerhardt | F16C 32/064 184/6 |
|---|---|---|---|---|
| 7,883,271 | B2 * | 2/2011 | Suzuki | F16C 19/14 384/462 |
| 8,403,110 | B2 * | 3/2013 | Suzuki | F16C 33/6651 384/445 |
| 2006/0165328 | A1 | 7/2006 | Ueno et al. | |
| 2011/0079078 | A1 * | 4/2011 | Ho | G01F 23/268 73/304 C |

FOREIGN PATENT DOCUMENTS

| JP | 2004-108388 A | 4/2004 |
|---|---|---|
| JP | 2009-058091 A | 3/2009 |

* cited by examiner

*Primary Examiner* — James Pilkington
(74) *Attorney, Agent, or Firm* — Oliff PLC (57) ABSTRACT

A rolling bearing apparatus includes a bearing portion with an inner ring and an outer ring, and a lubrication unit provided adjacently to an annular space formed between the inner ring and the outer ring. The lubrication unit has a tank in which a lubricant to be supplied to the annular space is stored and which enables the lubricant to flow out through a lower part of the tank. The lubricant is electrically conductive. The lubrication unit further includes a first electrode provided in the lower part in the tank, a second electrode provided at a position higher than a position of the first electrode in the tank, and a wiring section electrically connected to the first electrode and the second electrode so as to allow electric continuity between the first electrode and the second electrode to be detected.

5 Claims, 4 Drawing Sheets

ROLLING BEARING APPARATUS AND LUBRICATION UNIT

INCORPORATION BY REFERENCE

The disclosure of Japanese Patent Application No. 2014-150195 filed on Jul. 23, 2014 including the specification, drawings and abstract, is incorporated herein by reference in its entirety.

BACKGROUND OF THE INVENTION

1. Field of the Invention

The invention relates to a rolling bearing apparatus with a supply unit that supplies a slight amount of lubricant to a bearing portion and a lubrication unit that supplies a slight amount of lubricant to rotating components such as a rolling bearing.

2. Description of Related Art

Rolling bearings are used as spindle bearings for machine tools. Some rolling bearings adopt oil-air lubrication in order to ensure appropriate lubrication of the rolling bearing (see, for example, Japanese Patent Application Publication No. 2009-58091 (JP 2009-58091 A)). However, the oil-air lubrication involves high running costs due to air consumption and needs incidental facilities such as an oil-air supply apparatus and an air clean unit, possibly leading to high facility costs.

As another means for lubricating a rolling bearing, a bearing apparatus incorporating a lubrication unit is known (see, for example, Japanese Patent Application Publication No. 2004-108388 (JP 2004-108388 A)). In the bearing apparatus, an annular lubrication unit is installed on a fixed bearing ring (fixed ring) of an inner ring and an outer ring, and the rolling bearing and the lubrication unit are integrated together. The lubrication unit includes a tank in which a lubricant is stored and a pump that discharges the lubricant in the tank into an annular space between the inner ring and the outer ring.

A slight amount of lubricant is discharged from the pump. The amount of lubricant discharged is adjusted by controlling operations of the pump. In a bearing apparatus including such a lubrication unit as described above along with a rolling bearing, a slight amount of lubricant can be discharged into the annular space formed between the inner ring and the outer ring. The discharged lubricant adheres to raceway surfaces of the inner and outer rings and to rolling elements, thus allowing the rolling bearing to be lubricated.

In a bearing apparatus with such a lubrication unit as described above, the tank with the lubricant stored therein is stored in a bearing housing along with the rolling bearing. Thus, determining the amount of lubricant remaining in the tank is not easy. When the amount of lubricant remaining in the tank is unknown, making an appropriate maintenance schedule is impossible. Furthermore, an erroneous period of maintenance leads to rotation of the rolling bearing in an unlubricated state, resulting in seizure or the like.

SUMMARY OF THE INVENTION

An object of the present invention is to provide a rolling bearing apparatus and a lubrication unit that enable the amount of lubricant remaining in the lubrication unit to be known.

A rolling bearing apparatus according to an aspect of the present invention includes: a bearing portion having an inner ring, an outer ring, a plurality of rolling elements interposed between the inner ring and the outer ring, and a cage that holds the rolling elements such that the rolling elements are arranged in a circumferential direction; and a lubrication unit having a tank in which a lubricant to be supplied to an annular space formed between the inner ring and the outer ring is stored and which enables the lubricant to flow out through a lower part of the tank, the lubrication unit being provided adjacently to the annular space. The lubricant is electrically conductive, and the lubrication unit further includes a first electrode provided in the lower part in the tank, a second electrode provided at a position higher than a position of the first electrode in the tank, and a wiring section electrically connected to the first electrode and the second electrode so as to allow electric continuity between the first electrode and the second electrode to be detected.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
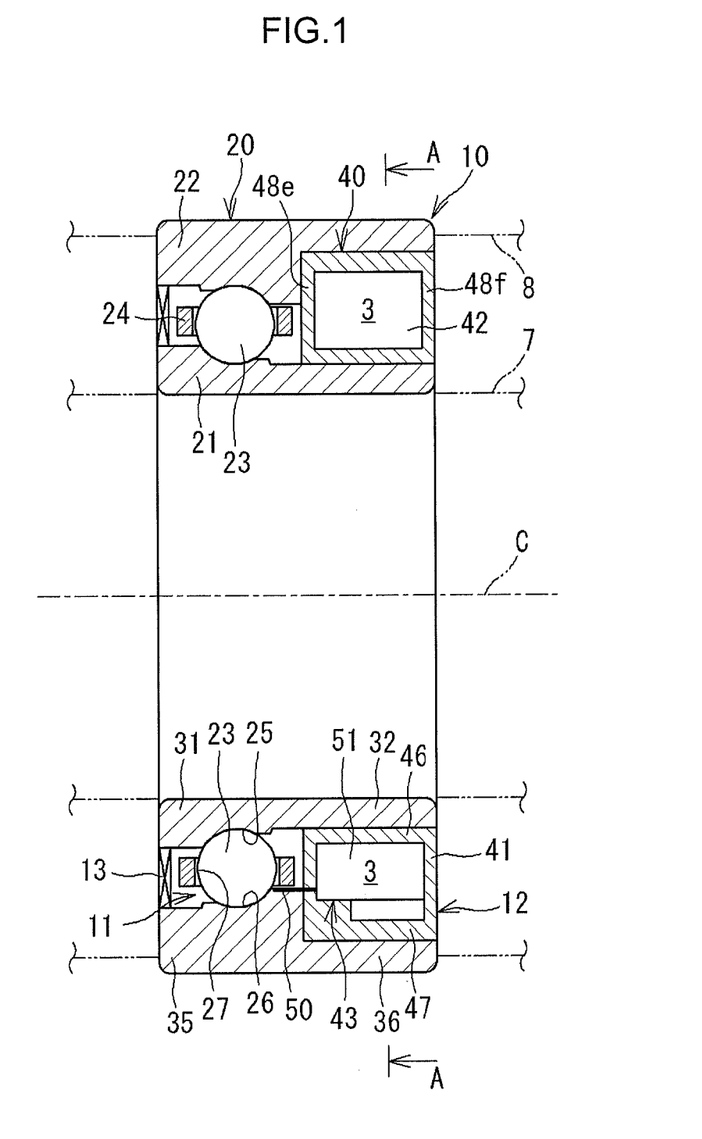
FIG. 1 is a longitudinal sectional view of a rolling bearing apparatus.
Figure 2:
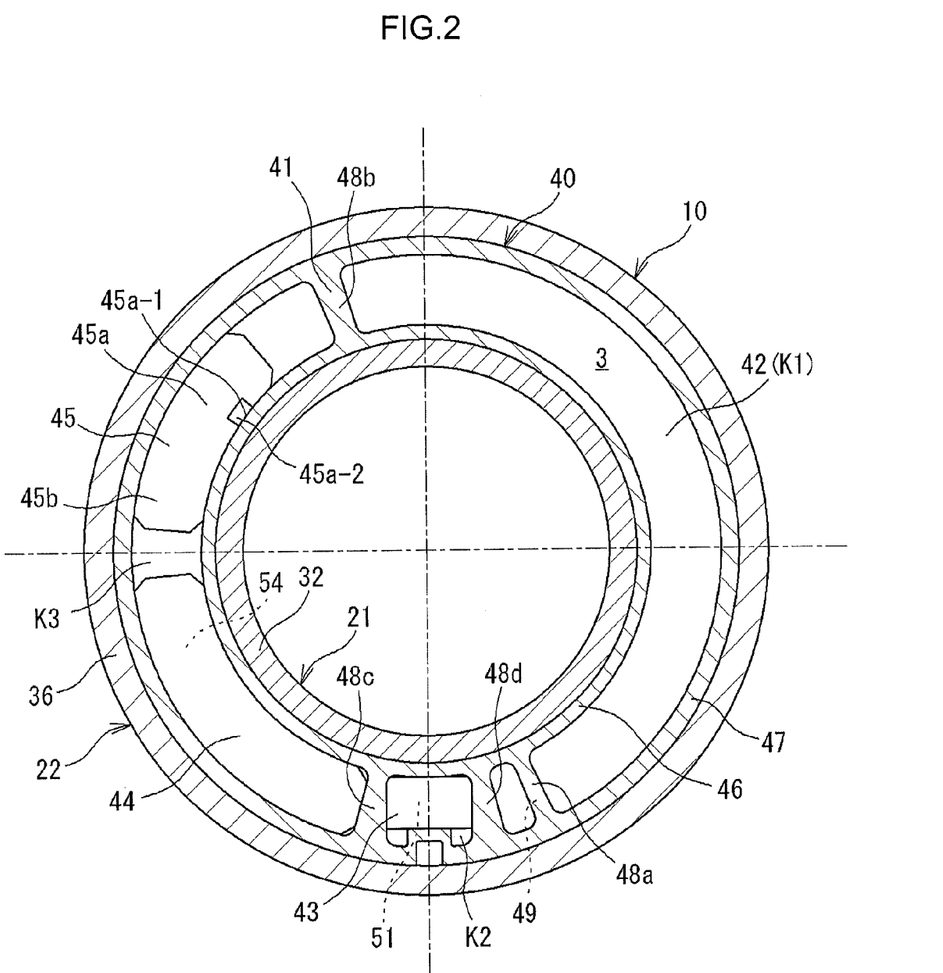
FIG. 2 is a transverse sectional view of the rolling bearing apparatus depicted in FIG. 1.

An embodiment of a rolling bearing apparatus will be described. FIG. 1 is a longitudinal sectional view of a rolling bearing apparatus 10. FIG. 2 is a transverse sectional view of the rolling bearing apparatus 10 depicted in FIG. 1. FIG. 2 is a cross-sectional view taken along line A-A in FIG. 1. As depicted in FIG. 1, the rolling bearing apparatus 10 includes a bearing portion 20 and a lubrication unit 40. The rolling bearing apparatus 10 in the present embodiment is housed in a bearing housing 8 in order to support a spindle (shaft 7) of a machine tool so as to enable rotation of the spindle.

The bearing portion 20 has an inner ring 21, an outer ring 22, a plurality of balls (rolling elements) 23, and a cage 24 that holds the balls 23. The inner ring 21 includes a cylindrical member externally fitted over the shaft 7. The inner ring 21 has an inner ring main body portion 31 on a first side in an axial direction (in FIG. 1, the left side) and an inner ring extension portion 32 on a second side in the axial direction (in FIG. 1, the right side). As a raceway surface, a raceway groove (hereinafter referred to as an inner ring raceway groove 25) is formed on an outer periphery of the inner ring main body portion 31. In the present embodiment, the inner ring main body portion 31 and the inner ring extension portion 32 are integrated together and are indivisible but may be separate from each other. In other words, the inner ring extension portion 32 may be a ring-shaped spacer. The outer ring 22 includes a cylindrical member fixed to an inner peripheral surface of the bearing housing 8. The outer ring 22 has an outer ring main body portion 35 on the first side in the axial direction and an outer ring extension portion 36 on the second side in the axial direction. As a raceway surface, a raceway groove (hereinafter referred to as an outer ring raceway groove 26) is formed on an inner periphery of the outer ring main body portion 35. In the present embodiment, the outer ring main body portion 35 and the outer ring extension portion 36 are integrated together and are indivisible but may be separate from each other. In other words, the outer ring extension portion 36 may be a ring-shaped spacer.

The balls 23 are interposed between the inner ring main body portion 31 and the outer ring main body portion 35 and roll in the inner ring raceway groove 25 and the outer ring raceway groove 26. The cage 24 includes an annular member and has a plurality of pockets 27 formed along a circumferential direction. The cage 24 has a pair of ring portions and pillar portions that join the ring portions together. In the cage 24, the pockets 27 are each formed between the ring portions and a pair of the pillar portions that are adjacent to each other in the circumferential direction. Each of the balls 23 is housed in a corresponding one of the pockets 27. Thus, the cage 24 can hold the plurality of balls 23 so as to arrange the balls 23 in the circumferential direction. In the present invention, the balls 23 are in contact with the raceway grooves 25 and 26 at a certain contact angle. The bearing portion 20 is an angular ball bearing. When the rolling bearing apparatus 10 is used for a machine tool, the pockets 27 are typically cylindrical.

A first annular space 11 is formed between the inner ring main body portion 31 and the outer ring main body portion 35. A second annular space 12 is formed between the inner ring extension portion 32 and the outer ring extension portion 36. The first annular space 11 and the second annular space 12 are contiguous with each other. A seal member 13 is provided on the first side of the first annular space 11 in the axial direction to prevent a lubricant inside the bearing where the balls 23 and the cage 24 are present from escaping to the exterior of the bearing. Although not depicted in the drawings, a seal member may be provided between the first annular space 11 and the second annular space 12. The seal member may be provided outside the bearing as long as the lubricant inside the bearing can still be prevented from escaping to the exterior.

The balls 23 and the cage 24 are provided in the first annular space 11. The lubrication unit 40 is provided in the second annular space 12. In the present embodiment, the inner ring 21, which is a rotating bearing ring, rotates along with the shaft 7 with respect to the outer ring 22, which serves as a fixed bearing ring. Thus, the lubrication unit 40 is fitted on and attached to an inner peripheral surface of the outer ring extension portion 36 in a close contact manner. In contrast, a very small gap is formed between an outer peripheral surface of the inner ring extension portion 32 and an inner peripheral surface of the lubrication unit 40 (an annular frame 41 described below) to prevent the lubrication unit 40 from hindering rotation of the inner ring 21.

As depicted in FIG. 2, the lubrication unit 40 is generally shaped like a ring. The lubrication unit 40 includes a frame 41, a tank 42, a pump 43, a circuit section 44, and a power supply section 45.

The frame 41 is, for example, an annular member formed of resin and has a short-cylinder-shaped inner peripheral wall 46, a short-cylinder-shaped outer peripheral wall 47, and a plurality of partition walls 48a, 48b, 48c, and 48d provided between the peripheral walls 46 and 47, and sidewalls 48e and 48f (see FIG. 1). The walls define a plurality of spaces K1, K2, and K3 along the circumferential direction.

The first space K1 forms the tank 42. The pump 43 is stored in the second space K2. The circuit section 44 and the power supply section 45 are stored in the third space K3.

Thus, the frame 41, the tank 42, the pump 43, the circuit section 44, and the power supply section 45 are integrated to form the lubrication unit 40.

The lubrication unit 40 is detachably attached to the outer ring 22 (outer ring extension portion 36), which serves as the fixed bearing ring. The lubrication unit 40 is integrated with the bearing portion 20. As depicted in FIG. 1, the lubrication unit 40 provided in the second annular space 12 is provided adjacently to the first annular space 11 in the axial direction.

The tank 42 is intended to store a lubricant 3. In the present embodiment, as depicted in FIG. 2, the tank 42 is a space defined by a part of the inner peripheral wall 46, a part of the outer peripheral wall 47, the partition wall 48a, the partition wall 48b, and the sidewalls 48e and 48f (see FIG. 1). The tank 42 has, in a lower part thereof, an outlet portion (outlet port) 49 through which the stored lubricant 3 flows out to the pump 43. The outlet portion 49 and the pump 43 (a housing portion 51 described below) are joined together through a channel (not depicted in the drawings). In other words, the tank 42 is configured to enable the lubricant 3 to flow out through the lower part of the tank 42. In particular, in the present embodiment, the tank 42 enables the lubricant 3 to flow out through the bottom of the tank 42.

The power supply section 45 has a power generating section 45a and a secondary battery section 45b. The power generating section 45a is configured such that rotation of the inner ring 21 enables the power generating section 45a to generate power. In other words, a rotor 45a-1 is provided on an outer periphery of the inner ring extension portion 32. The power generating section 45a has a stator 45a-2 provided on an inner periphery of the frame 41. The rotor 45a-1 is magnetized so as to alternately provide N poles and S poles along the circumferential direction. The stator 45a-2 is formed of a magnetic material and is provided such that the rotor 45a-1 passes through a radially inner side of the stator 45a-2. Power generated by the power generating section 45a is stored in the secondary battery section 45b.

The circuit section 44 includes a circuit board including a programmed microcomputer and transmits control signals (driving signals) to the pump 43. In other words, the circuit section 44 provides driving power (applies a predetermined voltage) to the pump 43. The circuit section 44 has a function to execute various processes besides the function to drive the pump 43 (driving control section). For example, the circuit section 44 functions as a detection section 54 to measure a current value, a voltage value, or a resistance value for electricity flowing through a circuit including an electrode 81 (see FIG. 4) described below. Based on the measured value acquired by the detection section 54, the amount of the lubricant 3 remaining in the tank 42 can be known. This function will be described below.

Figure 3:
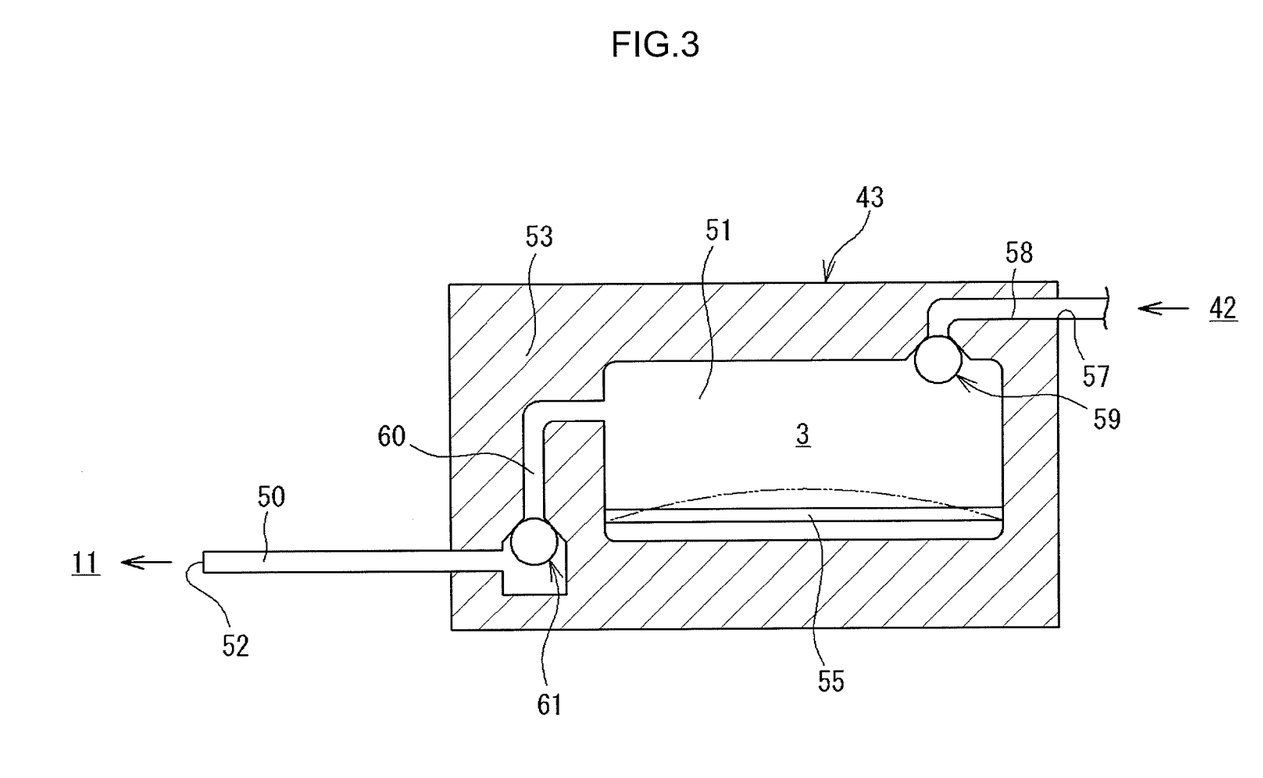
FIG. 3 is a sectional view illustrating a pump.

FIG. 3 is a sectional view illustrating the pump 43. The pump 43 includes a small pump (micro pump) and is attached to a part (lower part) of the frame 41 (see FIG. 2). As depicted in FIG. 3, the pump 43 includes a case 53, a nozzle 50, the housing portion 51, and a piezoelectric element 55. The nozzle 50 is provided so as to extend from the case 53. The housing portion 51 stores the lubricant 3. The piezoelectric element 55 is used to discharge the lubricant.

The pump 43 has an upstream side channel 58 and a first check valve 59. The upstream side channel 58 joins the housing portion 51 to an inlet port 57 through which the lubricant 3 having flowed from the tank 42 flows into the pump 43. The first check valve 59 prevents the lubricant 3 in the housing portion 51 from flowing back toward the tank 42 side. The pump 43 further has a downstream side channel 60 and a second check valve 61. The downstream side channel 60 connects the housing portion 51 and the nozzle 50 together. The second check valve 61 is provided in the middle of the downstream side channel 60 to prevent the lubricant 3 from flowing back from the nozzle 50 to the housing portion 51.

The housing portion 51 includes a space formed in the case 53. The housing portion 51 is filled with the lubricant 3. The pump 43 has the piezoelectric element 55 as a driving portion that drives the lubricant 3 in the housing portion 51 to discharge the lubricant 3 into the first annular space 11.

The piezoelectric element 55 is shaped like a plate and provides a part of an inner wall of the housing portion 51. When a voltage is applied to the piezoelectric element 55, the piezoelectric element 55 is deformed (displaced), and the deformation causes a reduction in the volume of the housing portion 51 to discharge the lubricant 3 in a full state in the housing portion 51, into the first annular space 11 through the nozzle 50. The deformed piezoelectric element 55 is depicted by a long dashed double-short dashed line in FIG. 3. To facilitate the understanding, the deformed state is exaggerated compared to the reality. The full state of the lubricant 3 in the housing portion 51 refers to a state where the housing portion 51 is full of the lubricant 3 and where, when the piezoelectric element 55 is deformed to reduce the volume of the housing portion 51, the internal pressure of the lubricant 3 in the housing portion 51 significantly rises. Then, when the piezoelectric element 55 recovers the original shape, the first check valve 59 is opened to allow the lubricant 3 in the tank 42 to be sucked into the housing portion 51.

Application of a voltage to the piezoelectric element 55 and a timing for the application of the voltage are controlled by the circuit section 44 (see FIG. 2). The power applied to the piezoelectric element 55 is supplied by the power supply section 45 (secondary battery section 45b). A pulsed voltage is applied to the piezoelectric element 55 to allow the lubricant 3 to be intermittently discharged. A slight amount of discharge can be achieved by controlling the number of pulses and the value of the voltage applied to the piezoelectric element 55.

The pump 43 is driven as described above to discharge the lubricant 3 in the pump (housing portion 51) to the exterior of the pump through the nozzle 50. The nozzle 50 is shaped like a needle and has a discharge port 52 at a tip of the nozzle 50. The discharge port 52 is open at the tip (tip surface) of the nozzle 50, and through the discharge port 52, the lubricant 3 is discharged toward the outer ring raceway groove 26 of the outer ring 22 (see FIG. 1), which serves as the fixed bearing ring. A longitudinal direction of the nozzle 50 is present on a plane containing a center line of the rolling bearing apparatus 10. The nozzle 50 may be formed to extend through a space between an inner peripheral surface of the cage 24 and an outer peripheral surface of the inner ring 21 to discharge the lubricant to an inner ring side part of each of the balls 23.

Now, the amount of the lubricant 3 discharged by the pump 43 will be described. When the pump 43 receives the driving signal (control signal) from the circuit section 44, the piezoelectric element 55 is driven to discharge the lubricant 3 through the nozzle 50 in the form of droplets. A constant amount (appropriately constant amount) of droplets of the lubricant 3 are discharged by a single driving operation of the pump 43 (piezoelectric element 55). The amount (volume) of droplets discharged per driving operation (shot) of the pump 43 may be five picoliters to seven microliters or may be set to one nanoliter to 1,000 nanoliters or five picoliters to 1,000 picoliters. The frequency of this lubrication (time intervals between shots) may be every several seconds, every several minutes, or every several hours. As described above, the pump 43 allows the lubricant 3 to be intermittently supplied (at regular time intervals) to the first annular space 11 (see FIG. 1) formed between the inner ring 21 and the outer ring 22. The rolling bearing apparatus 10 with the lubrication unit 40 as described above enables a slight amount of the lubricant 3 to be supplied to the bearing portion 20 and is also referred to as a nano-lubrication bearing.

The lubrication unit 40 in the present embodiment has a function to manage the residual amount of the lubricant 3 to be supplied to the first annular space 11. A configuration providing this function will be described below.

The lubricant 3 will be described. The lubricant 3 is electrically conductive, and for example, a lubricant disclosed in International Publication No. WO 2004/090082 may be adopted.

Figure 4:
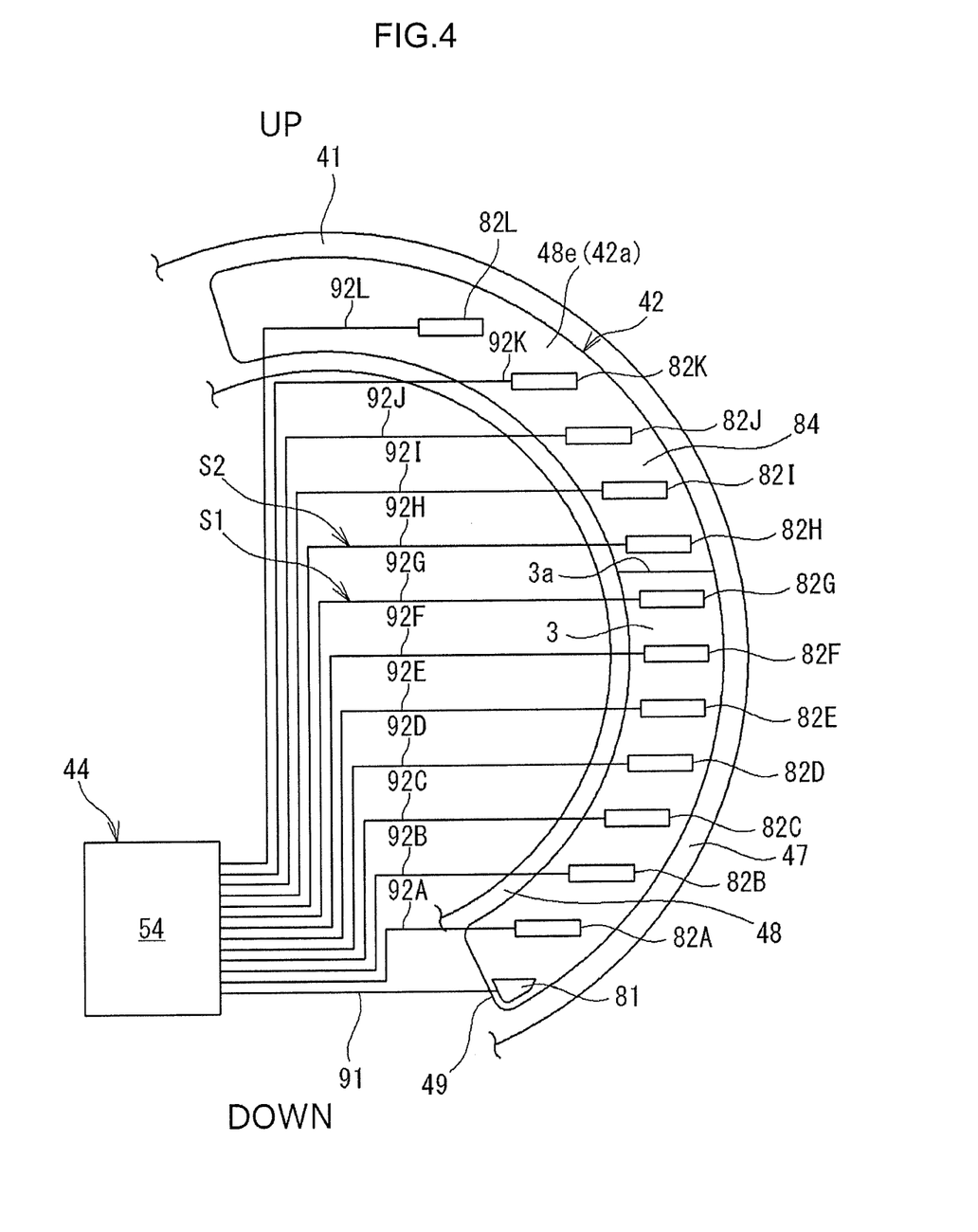
FIG. 4 is a diagram schematically illustrating a tank.

FIG. 4 is a diagram schematically illustrating the tank 42. The first electrode 81 is provided in a lower part (bottom) in the tank 42. A first electric wire 91 is connected to the first electrode 81. In the tank 42, a second electrode is provided at a position higher than a position of the first electrode 81. In the present embodiment, a plurality of the second electrodes 82A to 82L is provided. The second electrodes 82A to 82L are provided at intervals (regular intervals) along a height direction (up-down direction) of a surface 42a in the tank 42. Second electric wires 92A to 92L are connected to the second electrodes 82A to 82L, respectively.

In FIG. 4, the first electric wire 91 and the second electric wires 92A to 92L are illustrated to stick out from the frame 41. This illustration is for description, and the electric wires 91 and 92A to 92L are arranged along the frame 41 and connected to the circuit section 44.

The first electrode 81 and the second electrodes 82A to 82L may be attached directly to the wall (sidewall 48e) of the frame 41. However, the first electrode 81 and the second electrodes 82A to 82L may be provided on a substrate with substantially the same shape as that of the wall (sidewall 48e), and the substrate may be attached to the wall (sidewall 48e). In this case, the electric wires 91 and 92A to 92L are partly formed on the substrate as a wiring pattern. A surface 42a on which the electrodes 81 and 82A to 82L may be other than the sidewall 48e or may be an outer peripheral wall 47 or the like.

In the surface 42a in the tank 42, a lubricant repellant portion 84 is provided in an area other than the area in which the first electrode 81 and the second electrodes 82A to 82L are provided. For example, a film that is repellant to the lubricant 3 used may be formed on the surface 42a in the tank 42. For example, a repellant resin film (fluorine resin film) may be formed.

The detection section 54 of the circuit section 44 can apply a voltage to the first electrode 81 through the first electric wire 91. The detection section 54 also executes a process of detecting electric continuity between the first electrode 81 and each of the second electrodes 82A to 82L at needed time intervals. The detection of the electric continuity is enabled by the electric conductivity of the lubricant 3. In the present embodiment, the process of detecting the electric continuity involves measuring the resistance value of electricity flowing through a circuit including the first electrode 81 and each of the second electrodes 82A to 82L.

Functions of the lubrication unit 40 configured as described above will be described. When the rolling bearing apparatus 10 depicted in FIG. 1 and FIG. 2 is used, the lubricant 3 is supplied from the lubrication unit 40 to the bearing portion 20. Consequently, the lubricant 3 in the tank is consumed (decreases). For example, it is assumed that the surface 3a of the lubricant 3 is positioned between the second electrode 82G and the second electrode 82H, as depicted in FIG. 4.

In this case, the second electrode 82G is immersed in the electrically conductive lubricant 3. This forms a closed circuit S1 including the first electric wire 91, the first electrode 81, the lubricant 3, the second electrode 82G, and the second electric wire 92G. The detection section 54 of the circuit section 44 measures the resistance value of electricity flowing through the circuit S1 and can acquire a predetermined measured value (resistance value) (other than an infinite value).

In order to detect the electric continuity between the first electrode 81 and the second electrode 82H positioned directly above the second electrode 82G immersed in the lubricant 3, the detection section 54 measures the resistance value of electricity flowing through a circuit S2 including the first electrode 81 and the second electrode 82H. Then, since the second electrode 82H included in the circuit S2 is positioned above the surface 3a of the lubricant 3, the detection section 54 acquires the infinite resistance value.

Since the lubricant repellant portion 84 is provided in the area other than the area where the first electrode 81 and the second electrodes 82A to 82L are provided as described above, the lubricant repellant portion 84 is also present between the second electrode 82G and the second electrode 82H. Thus, even though the two electrodes 82G and 82H are adjacent and close to each other, the insulation between the electrodes 82G and 82H is enhanced, resulting in a clear difference in resistance value between the electrodes 82G and 82H (the difference between the predetermined value and the infinite value).

As described above, the detection section 54 detects the electric continuity (resistance value) between the first electrode 81 and each of the second electrodes 82A to 82L. This enables the level at which the surface 3a of the lubricant 3 is positioned to be known. In other words, the detection section 54 can detect that the surface 3a is positioned between the second electrode (82H), which exhibits the infinite resistance value, and the second electrode (82G), which exhibits the predetermined resistance value.

Furthermore, to allow an operator (manager) to know at which level (height) the surface 3a of the lubricant 3 is positioned, the detection section 54 outputs a detection signal. In other words, the detection section 54 associates identification number data set for the respective second electrodes 82A to 82L with data on values (resistance values) measured for the respective second electrodes 82A to 82L to output the resultant data as the detection signal. The data on the measured resistance values may be the resistance values themselves. For example, when the predetermined resistance value (other than the infinite value) is obtained, the value may be represented as data of "1". When the resistance value is infinite, the value may be represented as data of "0".

The detection signal is wirelessly (or in a wired manner) output from the detection section 54 (circuit section 44) to the exterior of the rolling bearing apparatus 10. In the present embodiment, the output detection signal can be received by a control apparatus for a machine tool. Upon receiving the detection signal, the control apparatus outputs the data contained in the detection signal to the operator. For example, the data is output to a monitor for the control apparatus. Upon viewing the data, the operator can know where the surface 3a of the lubricant 3 is positioned and predict the period of maintenance.

When the surface 3a of the lubricant 3 is lower than the lowermost second electrode 82A, in other words, when the surface 3a is positioned between the lowermost second electrode 82A and the first electrode 81, the electric continuity between the first electrode 81 and the second electrode 82A is lost. In other words, the circuit including the second electrode 82A exhibits the infinite resistance value. In this case, the detection section 54 outputs the detection signal to allow the operator to know that the lubricant 3 will be exhausted soon. Consequently, maintenance work can be performed on the rolling bearing apparatus 10. As a result, the bearing portion 20 can be prevented from being used in an unlubricated state.

As described above, the lubrication unit 40 includes the first electrode 81, the second electrodes 82A to 82L, the first electric wire 91, and the second electric wires 92A to 92L. The first electric wire 91 and the second electric wires 92A to 92L are connected to the first electrode 81 and the second electric electrodes 82A to 82L, respectively, and serve as a wiring section that allows detection of the electric continuity between the first electrode 81 and each of the second electrodes 82A to 82L. In this configuration, the lubricant 3 stored in the tank 42 is electrically conductive. Consequently, when the surface 3a of the lubricant 3 is, for example, positioned at a height equal to or larger than the height of the second electrode 82G as in the above-described embodiment, a circuit S1 is formed which includes the lubricant 3, the first electrode 81, the second electrode 82G, and the electric wires 91 and 92G. Thus, the electric continuity between the first electrode 81 and the second electrode 82G is detected. In contrast, when the surface 3a of the lubricant 3 is positioned lower than the second electrode 82G, the electric continuity exhibits a different state. In other words, when the surface 3a of the lubricant 3 is lower than the second electrode 82G, the electric continuity between the first electrode 81 and the second electrode 82G is lost.

As described above, the electric continuity between the first electrode 81 and each of the second electrodes 82A to 82L is detected to enable the amount of the lubricant 3 remaining in the tank 42 to be known.

In the above-described embodiment, the case where the plurality of second electrodes 82A to 82L is provided has been described. However, at least one second electrode may be provided. When, for example, a single second electrode is provided, the second electrode 82A depicted in FIG. 4 and located at the lowermost position may be provided. In this case, before the lubricant 3 in the tank 42 is exhausted, the state of electric continuity changes. This can be detected by the detection section 54 to allow maintenance work to be performed.

However, the plurality of second electrodes 82A to 82L is preferably provided such that the second electrodes 82A to 82L are arranged at intervals along the height direction of the surface 42a in the tank 42 as in the present embodiment. In this case, the state of the electric continuity between the first electrode 81 and each of the second electrodes 82A to 82L varies according to the position of the surface 3a of the lubricant 3 remaining in the tank 42. This enables the position of the surface 3a of the lubricant 3 remaining in the tank 42 to be known in detail. In other words, as described above in the embodiment, the surface 3a can be known to lie between the second electrode 82G and the second electrode 82H positioned below the second electrode 82H.

Furthermore, in the present embodiment, the case has been described where the detection section 54 measures the resistance value of electricity flowing through the first electric wire 91 and each of the second electric wires 92A to 92L, which correspond to the wiring section allowing the electric continuity to be detected. However, the measured value may be other than the resistance value and may be a current value or a voltage value. For the current value or the voltage value, the current value (or voltage value) of electricity flowing through a circuit including the second electrode positioned above the surface 3a is zero. The current value (or voltage value) of electricity flowing through a circuit including the second electrode positioned below the surface 3a is a predetermined value equal to or larger than zero. Thus, even measurement of the current value or the voltage value allows the position of the surface 3a to be detected because the state of electric continuity varies between the second electrode positioned above the surface 3a and the second electrode positioned below the surface 3a.

Another application example (1) will be described. In the above-described embodiments, the case has been described where the rotating bearing ring is the inner ring 21, whereas the fixed bearing ring is the outer ring 22. However, it is also preferable that the rotating bearing ring be the outer ring 22, whereas the fixed bearing ring be the inner ring 21. Moreover, although not depicted in the drawings, the rolling bearing apparatus 10 may further include, in the frame 41, various sensors that detect temperature, vibration, an oil film condition on the raceway surface, and the like so that the circuit section 44 can determine (change) driving conditions (the amount of lubricant discharged by a single operation and discharge intervals) for the pump 43 based on detection signals from the sensors.

Another application example (2) will be described below. In the above-described embodiments, the lubrication unit 40 is integrated with the bearing portion 20 to provide the rolling bearing apparatus 10. However, the lubrication unit 40 may be used with another component or the like. For example, the lubrication unit 40 may be combined with a rotating component such as a one-way clutch or a ball screw. In this case, the lubrication unit 40 is provided adjacently to a lubrication-needed area of the rotating component. The lubrication unit 40 includes a tank 42 in which the lubricant 3 to be supplied to the lubrication-needed area is stored and which enables the lubricant 3 to flow out through a lower part of the tank 42. The lubricant 3 is electrically conductive. Moreover, the lubrication unit 40 includes the first electrode 81, the at least one second electrode (82A to 82L), and the wiring section (91 and 92A to 92L). The first electrode 81 is provided in the lower part in the tank 42. The second electrode (82A to 82L) is provided at a position higher than the position of the first electrode 81 in the tank 42. The wiring section (91 and 92A to 92L) is electrically connected to the first electrode 81 and the second electrode (82A to 82L) so as to allow the electric continuity between the first electrode 81 and the second electrode (82A to 82L) to be detected.

The rolling bearing apparatus 10 and the lubrication unit 40 in the present invention are not limited to the illustrated forms but may be in any other form within the scope of the present invention. For example, in the above-described embodiments, the case has been described where the lubrication unit 40 includes the power supply section 45 in the frame 41. However, the power supply section 45 may be provided outside the frame 41. In this case, the circuit section 44 (pump 43) in the frame 41 and the external power supply section 45 are connected together through a cable.

Furthermore, in the above-described embodiments of the rolling bearing apparatus 10, the bearing portion 20 is a ball bearing. However, the bearing portion 20 may be a roller bearing.

The rolling bearing apparatus of the present invention enables the amount of lubricant remaining in the lubrication unit, thereby enabling the bearing portion to be prevented from being used in the unlubricated state. The lubrication unit of the present invention enables the amount of lubricant remaining in the lubrication unit to be known, thereby enabling the rotating component to be prevented from being used in the unlubricated state.

What is claimed is:

1. A rolling bearing apparatus comprising:
a bearing portion having an inner ring, an outer ring, a plurality of rolling elements interposed between the inner ring and the outer ring, and a cage that holds the rolling elements such that the rolling elements are arranged in a circumferential direction; and
a lubrication unit having a tank in which a lubricant to be supplied to an annular space formed between the inner ring and the outer ring is stored and which enables the lubricant to flow out through a lower part of the tank, the lubrication unit being provided adjacently to the annular space, wherein
the lubricant is electrically conductive,
the lubrication unit further includes a first electrode provided in the lower part in the tank, a second electrode provided at a position higher than a position of the first electrode in the tank, and a wiring section electrically connected to the first electrode and the second electrode so as to allow electric continuity between the first electrode and the second electrode to be detected, and
a lubricant repellant portion is provided in an area other than areas of the first electrode and the second electrode in the tank.

2. The rolling bearing apparatus according to claim 1, wherein a plurality of the second electrodes is provided such that the second electrodes are arranged at intervals along a height direction of a surface in the tank.

3. The rolling bearing apparatus according to claim 2, wherein the lubrication unit further has a detection section that measures a current value, a voltage value, or a resistance value for electricity flowing through the wiring section.

4. The rolling bearing apparatus according to claim 1, wherein the lubrication unit further has a detection section that measures a current value, a voltage value, or a resistance value for electricity flowing through the wiring section.

5. A lubrication unit comprising a tank in which a lubricant to be supplied to a lubricant-needed area of a rotating component is stored and which enables the lubricant to flow out through a lower part of the tank, the lubrication unit being provided adjacently to the lubricant-needed area, wherein
the lubricant is electrically conductive,
the lubrication unit further includes a first electrode provided in the lower part in the tank, a second electrode provided at a position higher than a position of the first electrode in the tank, and a wiring section electrically connected to the first electrode and the second electrode so as to allow electric continuity between the first electrode and the second electrode to be detected, and a lubricant repellant portion is provided in an area other than areas of the first electrode and the second electrode in the tank.

* * * * *